United States Patent
Kim et al.

(10) Patent No.: US 7,242,548 B2
(45) Date of Patent: Jul. 10, 2007

(54) TAPE RECORDING/REPRODUCING APPARATUS

(75) Inventors: Gyoo-beom Kim, Yongin-si (KR); Young-yun Seol, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/187,883

(22) Filed: Jul. 25, 2005

(65) Prior Publication Data

US 2006/0007577 A1    Jan. 12, 2006

(30) Foreign Application Priority Data

Jul. 26, 2004    (KR) ...................... 10-2004-0058110

(51) Int. Cl.
*G11B 15/18* (2006.01)
*G11B 15/00* (2006.01)
*G11B 5/008* (2006.01)

(52) U.S. Cl. .......................... 360/69; 360/93; 360/96.5

(58) Field of Classification Search ...................... None
See application file for complete search history.

(56) References Cited

U.S. PATENT DOCUMENTS 5,535,071 A * 7/1996 Yamagishi et al. ........ 360/96.5

FOREIGN PATENT DOCUMENTS

| JP | 63-288456 | 11/1988 |
|---|---|---|
| JP | 1-130357 | 5/1989 |
| KR | 87-6552 | 7/1987 |
| KR | 94-2848 | 12/1994 |
| KR | 11-2001-0046400 | 6/2001 |

* cited by examiner

*Primary Examiner*—Andrea Wellington
*Assistant Examiner*—Jason Olson
(74) *Attorney, Agent, or Firm*—Staas & Halsey LLP

(57) ABSTRACT

A magnetic recording/reproducing apparatus includes a main chassis on which a head drum is mounted and a cassette holder to support a tape cassette. The cassette holder is mounted slidably on the main chassis. A pivoting lever is mounted pivotably on the main chassis and if operated in association with the cassette holder. A sensing switch provides information on insertion or ejection of the tape cassette, wherein the sensing switch is connected or separated according to the position on which the pivoting lever is pivoted.

3 Claims, 4 Drawing Sheets

TAPE RECORDING/REPRODUCING APPARATUS

CROSS-REFERENCE TO RELATED APPLICATION

This application claims benefit under 35 U.S.C. § 119 from Korean Patent Application No. 2004-58110, filed on Jul. 26, 2004, the entire content of which is incorporated herein by reference.

BACKGROUND OF THE INVENTION

1. Field of the Invention

The present invention relates to a tape recording/reproducing apparatus.

2. Description of the Related Art

In general, a tape recording/reproducing apparatus such as a VCR includes a main chassis in which a head drum is mounted, and a cassette loading/unloading unit for mounting a tape cassette in the main chassis. The cassette loading/unloading unit is usually mounted on the main chassis.

The cassette loading/unloading unit includes a cassette holder mounted slidably, in a horizontal and/or vertical direction, on the main chassis, a pivoting lever for moving the cassette holder in association therewith, the pivoting lever pivotably installed on the main chassis, and a driving unit for forcibly pivoting the pivoting lever. The driving unit includes a drive motor mounted on the main chassis, a main cam gear to be rotated by the drive motor, and a sliding member for selectively pivoting the pivoting lever, the sliding member moved by the main cam gear.

In the structure described above, if a user inserts the tape cassette into a cassette insertion hole provided in a front panel of machinery, the cassette is received in the cassette holder. If the cassette is pushed in, the cassette holder is slidably moved by the pushing force. Accordingly, the pivoting lever is moved and pivoted. If the cassette holder is moved to a certain extent, the drive motor is driven to rotate the main cam gear. As the sliding member is moved by the rotation of the main cam gear, the cassette holder is lowered such that the cassette is received at a predetermined position of the main chassis.

In the above structure, there is provided a sensing switch for sensing the state that the cassette holder is inserted to a certain extent, that is, the state that the cassette is inserted. The operation of the drive motor is performed by the sensing signal of the sensing switch. Therefore, since the time of starting the operation of the drive motor is determined by the point of time when the sensing switch is operated, a simple structure is required for operating the sensing switch at an accurate time according to the position in which the cassette is inserted.

SUMMARY OF THE INVENTION

According to an aspect of the present invention, a tape recording/reproducing apparatus accurately recognizes the insertion of a tape cassette.

According to an aspect of the present invention, there is provided a tape recording/reproducing apparatus including a main chassis in which a head drum is mounted; a cassette holder to support a tape cassette, the cassette holder mounted to be slidable on the main chassis, a pivoting lever mounted to be pivotable on the main chassis and operating in association with the cassette holder; and a sensing switch to provide information on the insertion or ejection of the tape cassette, the sensing switch connected or separated according to the position in which the pivoting lever is pivoted.

According to an aspect of the present invention, the tape recording/reproducing apparatus may further include a main substrate to support the sensing switch, the main substrate mounted on the lower part of the main chassis.

According to an aspect of the present invention, the tape recording/reproducing apparatus may further include a position determination unit to maintain a position of the pivoting lever and a space between the pivoting lever and the sensing switch.

According to an aspect of the present invention, the position determination unit may include a main substrate to support the sensing switch with a plurality of position determination holes, the main substrate mounted on the lower part of the main chassis; a plurality of position determination projections projected at the lower end of the main chassis and inserted in the position determination holes, respectively; a height control projection to determine a space between the sensing switch and the pivoting lever by controlling a depth that the position determination projection is inserted into the position determination hole, the height control projection extended from the main chassis to be connected with the upper side of the main substrate.

The pivoting lever may include an eccentric cam side around a fixed shaft to be pivotably connected with the cassette holder, and the eccentric cam side is connected to or separated from the sensing switch according to the position in which the pivoting lever is pivoted.

According to an aspect of the invention, the tape recording/reproducing apparatus may further include a driving unit to forcibly pivot the pivoting lever, and the driving unit is operated based on the point of time on which an ON signal of the sensing switch is generated.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art. Like numbers refer to like elements throughout the specification.

Figure 1:
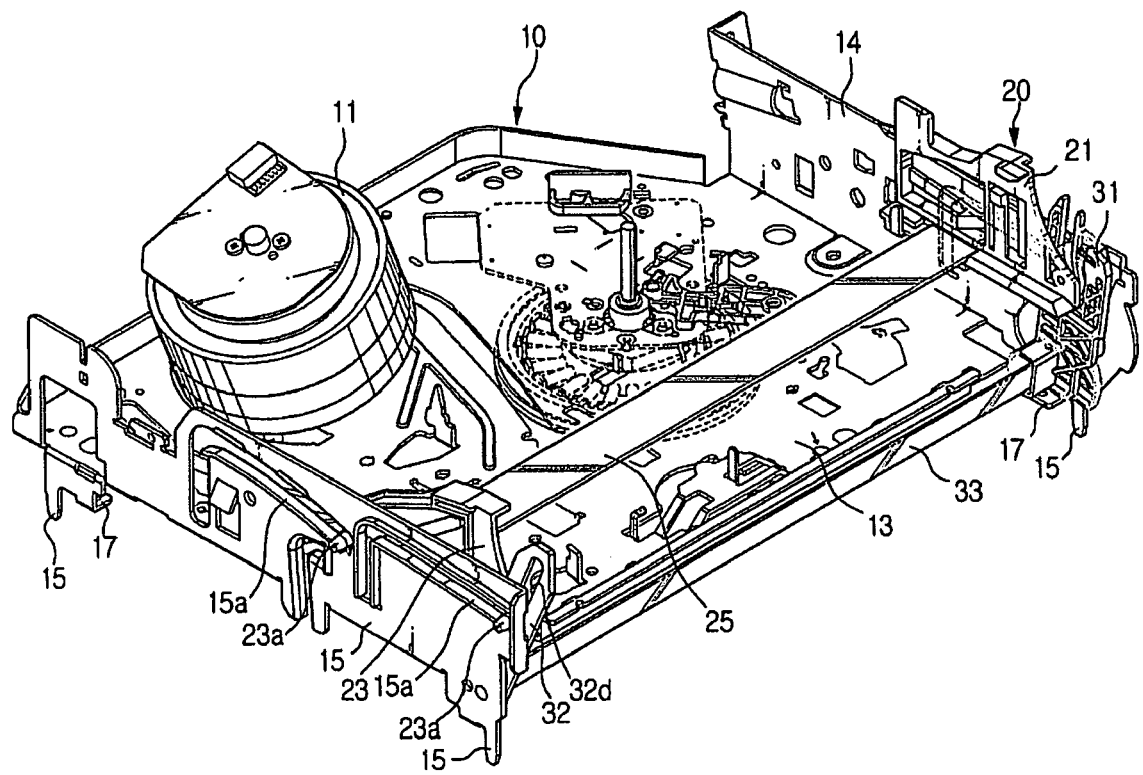
FIG. 1 is a schematic perspective view illustrating a tape recording/reproducing apparatus according to an embodiment of the present invention.
Figure 2:
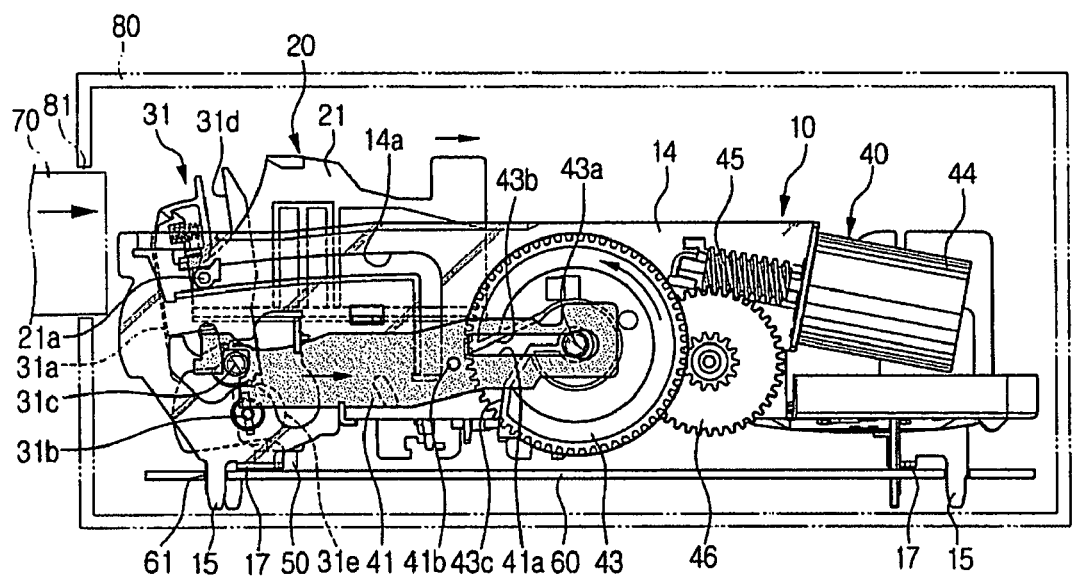
FIG. 2 is a side view of FIG. 1.

Referring to FIGS. 1 and 2, a tape recording/reproducing apparatus according to the embodiment of the present invention includes a main chassis 10, a cassette holder 20 movably mounted on the main chassis 10, pivoting levers 31, 32 operating in association with the cassette holder 20, a driving unit 40 for forcibly pivoting the pivoting levers 31, 32, and a main substrate 60 for supporting a sensing switch 50.

A head drum 11 for recording information on a tape as traveled or reproducing recorded information is rotatably mounted on the main chassis 10. The main chassis 10 is provided with a guide unit to guide a travel of the tape, and a tape driving unit to move the tape. The guide unit and the tape driving unit are not described in the detailed description of the drawings because those are publicly known arts.

The main chassis 10 includes a base 13 on which the head drum 11 is mounted, and sidewall 14 is bent toward both sides of the base 13. The sidewall unit 14, and guide slits 14a, 15a to guide the movement of the cassette holder 20, are formed in a predetermined shape.

The cassette holder 20 receives the cassette tape 70 inserted into machinery to be transferred at a predetermined loading position in the main chassis 10. The cassette holder 20 includes first and second holder bodies 21, 23 moved along cam slits 14a, 15a of the sidewall unit 14 and a connection frame 25 to connect the holder bodies 21, 23. The holder bodies 21, 23 include guide projections 21a, 23a to be inserted into the cam slits 14a, 15a, respectively. As the guide projection 21a, 23a are moved along the cam slits 14a, 15a, this makes it possible for the holder bodies 21, 23 to move slidably forward and backward, and up and down in the state of moving backward.

The pivoting levers 31, 32 are connected with the holder bodies 21, 23 respectively and operated in association with them. The pivoting levers 31, 32 are connected by a connection member 33 and moved together. The pivoting member 31 to be directly connected to the driving unit 40 includes a body 31a in a plate shape, a fixed shaft 31b formed in the body 31a and pivotably connected to the sidewall unit 14 of the main chassis 10, a driven pin 31c spaced from the fixed shaft 31b, a cam slit 31d inserted by a guide projection 21a of the holder body 21. The cam slit 31d is formed at a predetermined distance, in a longitudinal direction of the body 31a. The cam slit 31d is operated in association with the guide projection 21a such that the pivoting members 31, 32 are pivotable by a sliding movement of the cassette holder 20. Here, the pivoting member 32 includes a cam slit 32d inserted by a guide projection 23a, and operated in association therewith.

In a lower end part of the pivoting lever 31, there is provided an eccentric cam side 31e formed to be eccentric about the fixed shaft 31b. The eccentric cam side 31e is connected to or separated from the sensing switch 50 according to the position in which the pivoting lever 31 is pivoted.

The driving unit 40 includes a sliding member 41 slidably mounted in the sidewall unit 14 of the main chassis 10, a main cam gear 43 for moving the sliding member 41, a drive motor 44 mounted on the main chassis 10, and a plurality of gears 45, 46 for transferring the power of the drive motor 44 to the main cam gear 43.

One end of the sliding member 41 is connected to the driven pin 31c of the pivoting lever 31. The other end of the sliding member 41 is provided with a guide slit 41b and is supported by a shaft 43a of the main cam gear 43. The other end of the sliding member 41 is also provided with a cam pin 41b. The cam pin 41b is driven to cam guide units 43b, 43c formed in the main cam gear 43.

That is, when the main cam gear 43 is rotated counterclockwise, the cam guide unit 43b at the upper side operates the cam pin 41b to move the sliding member 41 to the right (in the direction of inserting the tape cassette) in FIG. 2. Further, when the main cam gear 42 is rotated clockwise, the cam guide unit 43c at the lower side operates the cam pin 41b to move the sliding member 41 to the left (in the direction of ejecting the tape cassette).

As described above, the sliding member 41 operates in association with the main cam gear 43 movable along a predetermined trace. When the tape cassette 70 is inserted to in the cassette holder 20, the drive motor 44 is driven from the point of time on which an ON signal is generated by the sensing switch 50 as pressed by the pivoting lever 31, to rotate the main cam gear 43. When the tape cassette is ejected, the drive motor 44 is driven from the time at which an OFF signal is generated by the sensing switch 50 by a predetermined time, and can be controlled to completely eject the tape. The drive of the drive motor 44 is controlled in a predetermined control unit.

The main substrate 60 is mounted on the lower part of the main chassis 10. The sensing switch 50 for sensing the insertion and ejection of the tape cassette 70 is mounted on the upper side of the main substrate 60. Specifically, the sensing switch 50 is spaced at a predetermined distance on the lower part of the pivoting lever 31. Therefore, when the pivoting lever 31 is pivoted, the eccentric cam side 31e is selectively connected to or separated from the sensing switch 50.

There is provided a position determination unit for maintaining the sensing switch 50 so as to be spaced at a predetermined distance from the pivoting lever 31 and for determining the position. The position determination unit includes a plurality of position determination holes 61 formed in the main substrate 60, a plurality of position determination projections 15 projectedly formed downward the main chassis 10 to be inserted in the position determination holes 61, and a height control projection 17 provided adjacent to the position determination projections 15.

When the position determination projection 15 is connected to the position determination hole 61 with inserted thereto, it is possible to arrange the pivoting lever 31 on the upper part of the sensing switch 50. Further, as the height control projection 17 contacts the upper side of the main substrate 60 to be supported thereby, the connection height of the main chassis 10 to the main substrate 60 is limited. Accordingly, it is possible to arrange the sensing switch 50 to be maintained, at a predetermined space, from the pivoting lever 31. According to an aspect of the present invention, the position determination projection 15 and the height control projection 17 are integrally formed with the main chassis 10, respectively. The height control projection 17 is formed with bent in the direction crossing the position determination projection 15.

In the tape recording/reproducing apparatus having the above-described structure, the sensing switch 50 is on/off by being directly connected to or separated from the pivoting lever 31 operated in association with the cassette holder 20. Therefore, the mechanism for operating the sensing switch 50 is simple, and the length of transferring the power is shortened, thereby making it possible to remarkably reduce the malfunction by structural errors. Further, as the sensing switch 50 is operated nearly at the same time by the movement of the cassette holder 20, it is also possible to remarkably reduce the occurrence of malfunction by time errors.

Further, as the pivoting lever 31 directly operates the sensing switch 50, any additional parts are not required, thereby making it possible to reduce costs.

Referring to FIGS. 2 through 7, the operation of the tape recording/reproducing apparatus according to the embodiment of the present invention is explained in detail.

FIG. 2 illustrates the state prior to the insertion of the tape cassette 70. The pivoting lever 31 is pivoted, to the maximum, in the direction of a cassette entrance 81 in a body 80, that is, to the left of FIG. 2. The pivoting lever 31 and the sensing switch 50 are not connected to each other. Here, if the tape cassette 70 is pushed into the cassette entrance 81, the tape cassette 70 is received in the cassette holder 20 and pushed to enter to the right by the sliding movement of the cassette holder 20.

Figure 3:
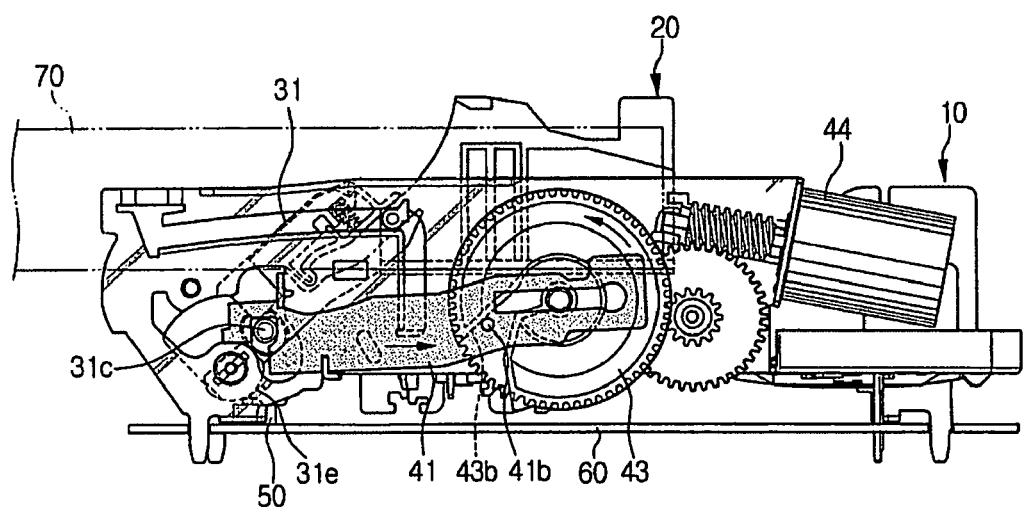
FIGS. 3 and 4 are schematic side views illustrating an operation wherein a tape cassette is inserted.

As shown in FIG. 3, the pivoting lever 31 operated in association with the cassette holder 20, which is moved to the right, is pivoted to the right (clockwise). The eccentric cam side 31e of the pivoting lever 31 is connected to the sensing switch 50. The sensing switch 50 outputs an ON signal by the contact with the pivoting lever 31. Further, as the pivoting lever 31 is pivoted, the sliding member 41 is operated in association with the driven pin 31c and moved, at a predetermined distance, to the right. Then, the cam pin 41b of the sliding member 41 is positioned within the operative range of the cam guide unit 43b.

Figure 4:
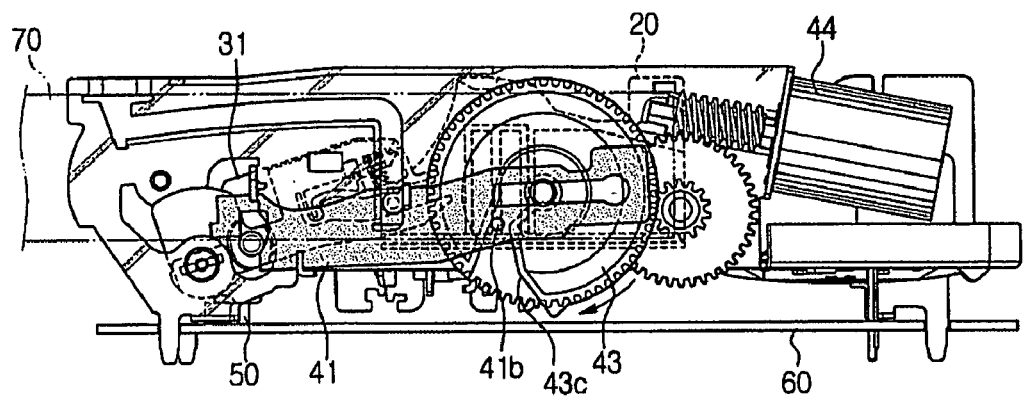

A control unit receiving the ON signal generated from the sensing switch 50 drives the drive motor 44. The main cam gear 43 is rotated counterclockwise accordingly. The sliding member 41 is operated in association therewith by the rotation of the main cam gear 43 and further moved to the right. If the pivoting lever 31 is operated in association with the sliding member 41 and further moved to the right, the cassette holder 20 is operated in association with the pivoting lever 31 and descended as shown in FIG. 4. Therefore, the cassette holder 20 is received in a base unit 11 of the main chassis 10, and the tape cassette 70 is placed at the loading position.

Figure 5:
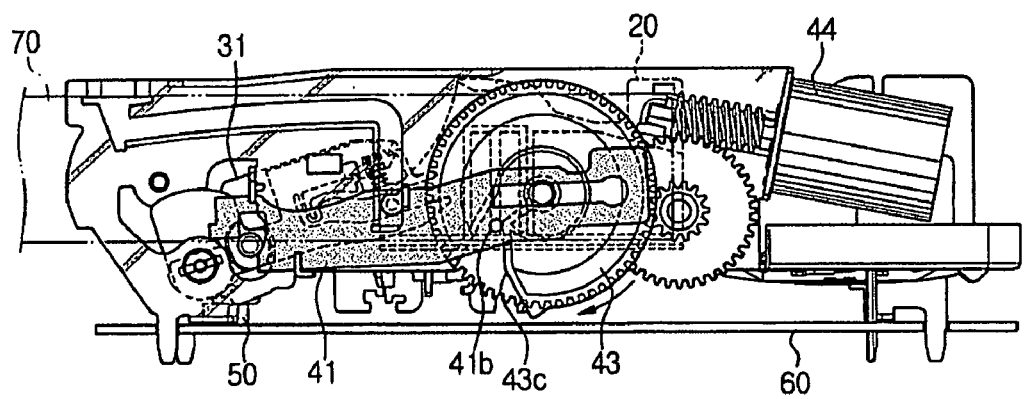
FIGS. 5 through 7 are schematic side views illustrating an operation wherein a tape cassette is ejected.

The operation of ejecting the tape cassette 70 is performed in a reverse order of operation of inserting the tape cassette 70. Referring to FIG. 4, if the drive motor 44 is driven in a counter direction when the cassette tape 70 is inserted, the main cam gear 43 is rotated clockwise. Then, the cam guide unit 43b of the main cam gear 43 is connected to the cam pin 41b such that the cam pin 41b is operated in association therewith as shown in FIG. 5.

Figure 6:
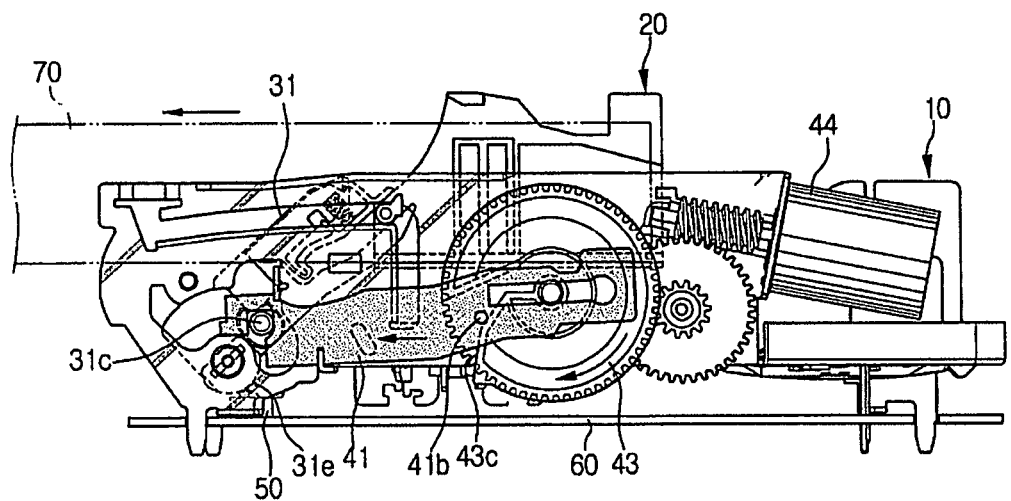

The sliding member 41 is moved to the left and the pivoting lever 31 is pivoted counterclockwise. Therefore, as shown in FIG. 6, the cassette holder 20 is operated in association with the pivoting lever 31 to be raised. Here, if the pivoting lever 31 is operated in association with the sliding member 41 so as to be further pivoted, the cassette holder 20 is further moved to the left.

Figure 7:
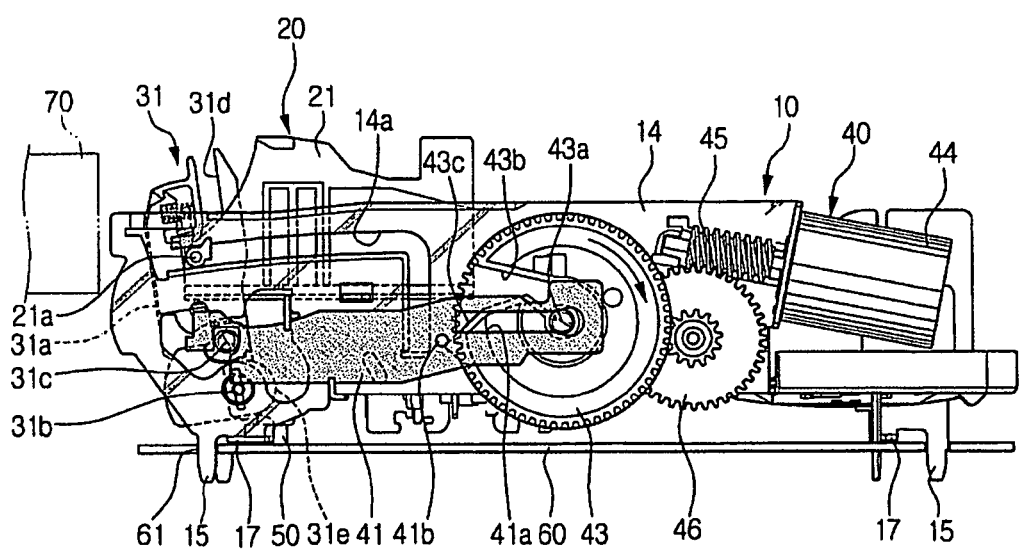

As shown in FIG. 7, the cam pin 41b of the sliding member 41 is pushed, to the maximum, by the cam guide unit 43c so that the cam pin 41b is moved to the position in which it is impossible to be any further driven. The sliding member 41, the pivoting lever 31 and the cassette holder 20 are stopped in the state of being moved to the maximum to the left. In this state, as the tape cassette 70 is out through the cassette entrance 81 of the body 80, a user holds the tape cassette 70 to be taken out by hand.

If the cam pin 41b is separated from the cam guide unit 43c as described above, even though the main cam gear 43 is rotated by more than a predetermined angle, the sliding member 41 is not loaded, thereby making it possible to prevent an error.

Further, in the process of the operation from FIG. 6 to FIG. 7, the pivoting lever 31 is separated from the sensing switch 50 such that an OFF signal from the sensing switch 50 is received in the control unit. The control unit appropriately controls the operation of stopping the drive motor, based on the OFF signal.

As described above, according to the data recording/reproducing apparatus of the present invention, there is a simple structure in which the force as generated upon inserting the tape cassette, is directly transferred to the sensing switch. Accordingly, there are provided the advantages that the reliability of the sensing switch is improved and the costs are reduced.

The foregoing embodiment and advantages are merely exemplary and are not to be construed as limiting the present invention. The present teaching can be readily applied to other types of apparatuses. The description of the embodiments of the present invention is intended to be illustrative, and not to limit the scope of the claims, and many alternatives, modifications, and variations will be apparent to those skilled in the art.

What is claimed is:

1. A data recording/reproducing apparatus comprising:
a main chassis in which a head drum is mounted;
a cassette holder to support a tape cassette, the cassette holder mounted to be slidable on the main chassis;
a pivoting lever pivotably mounted on the sidewall units and operated in association with the cassette holder; and
a sensing switch to provide information of insertion and ejection of the tape cassette, the sensing switch connected or separated according to a position where the pivoting lever is pivoted;
a position determination unit to maintain a position and a space between the pivoting lever and the sensing switch,
wherein the position determination unit comprises:
a main substrate to support the sensing switch, the main substrate mounted on the lower part of the main chassis and provided with a plurality of position determination holes;
a plurality of position determination projections projected toward the lower end of the main chassis and inserted in the position determination holes, respectively; and
a height control protection to control a depth that the position determination projection is inserted in the position determination hole and determining a space between the sensing switch and the pivoting lever, the height control projection extended from the main chassis to be in contact with the upper side of the main substrate.

2. The apparatus as claimed in claim 1, wherein the pivoting lever comprises an eccentric cam side around a fixed shaft connected to be pivotable to the cassette holder, wherein the eccentric cam side is connected to or separated from the sensing switch according to the position where the pivoting lever is pivoted.

3. The apparatus as claimed in claim 1, further comprising a drive unit to forcibly pivot the pivoting lever, wherein the drive unit is operated on the basis of the point of time on which the sensing switch generates an ON signal.

* * * * *

UNITED STATES PATENT AND TRADEMARK OFFICE
CERTIFICATE OF CORRECTION

| | | |
|---|---|---|
| PATENT NO. | : 7,242,548 B2 | Page 1 of 1 |
| APPLICATION NO. | : 11/187883 | |
| DATED | : July 10, 2007 | |
| INVENTOR(S) | : Gyoo-beom Kim et al. | |

It is certified that error appears in the above-identified patent and that said Letters Patent is hereby corrected as shown below:

Title Page, Column 2 Item 56 (Foreign Patent Documents), Line 5, change "11-2001-0046400" to --10-2001-0046400--.

Column 6, Line 48, change "protection" to --projection--.

Signed and Sealed this

Twenty-seventh Day of November, 2007

JON W. DUDAS
*Director of the United States Patent and Trademark Office*